United States Patent
Jodra et al.

(10) Patent No.: US 7,443,413 B2
(45) Date of Patent: Oct. 28, 2008

(54) LASER DIODE MODULATOR AND METHOD OF CONTROLLING LASER DIODE MODULATOR

(75) Inventors: Rodolfo Jodra, Boise, ID (US); George Henry Kerby, Boise, ID (US); Eugene A. Roylance, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 420 days.

(21) Appl. No.: 11/255,566

(22) Filed: Oct. 21, 2005

(65) Prior Publication Data

US 2007/0091164 A1    Apr. 26, 2007

(51) Int. Cl.
*B41J 2/435* (2006.01)
(52) U.S. Cl. .................. 347/247; 347/132; 347/237
(58) Field of Classification Search .................. 347/132, 347/237, 247
See application file for complete search history.

(56) References Cited

U.S. PATENT DOCUMENTS

| | | |
|---|---|---|
| 5,151,909 A | 9/1992 | Davenport et al. |
| 5,557,156 A | 9/1996 | Elings |
| 5,936,986 A | 8/1999 | Cantatore et al. |
| 6,144,684 A | 11/2000 | McMinn et al. |
| 6,175,375 B1 | 1/2001 | Able et al. |
| 6,198,497 B1 | 3/2001 | Luque |
| 6,229,120 B1 | 5/2001 | Jewell |
| 6,494,900 B1 | 12/2002 | Salansky et al. |
| 6,871,337 B2 | 3/2005 | Socha |
| 2005/0043606 A1 | 2/2005 | Pewzner et al. |

FOREIGN PATENT DOCUMENTS

DE    019822069    12/1998

*Primary Examiner*—Huan H Tran

(57) ABSTRACT

A method for adjusting a laser diode drive current pulse, comprises providing a power correction table comprising drive current pulse correction factors corresponding to counter positions. The method also comprises providing a jump table comprising counter position adjustments corresponding to correction factors. A count value of a position within the counter positions is maintained. Maintaining the count value comprises indexing the count value to the jump table and incrementing the count value for each of a series of pixel clocks. A correction factor is determined, wherein determining the current correction factor comprises indexing the count value to the power correction table.

18 Claims, 6 Drawing Sheets

LASER DIODE MODULATOR AND METHOD OF CONTROLLING LASER DIODE MODULATOR

BACKGROUND OF THE DISCLOSURE

Vertical Cavity Surface Emitting Laser (VCSEL) devices are used in some printers. VCSEL devices may be turned on and off by providing a drive current pulse at a current value above the threshold necessary to stimulate emission of light. The emitted light pulses are directed onto areas to be printed.

VCSEL devices have a laser light power output characteristic in which the output power changes over time when turned on and the output power at the beginning of an "on" pulse is different from the output power at the end of a previous "on" pulse.

A printer may have image processing or a print engine which determines when a VCSEL laser should be on to expose a particular pixel or sub-pixel. The image processing or print engine may be programmed to determine the proper exposure based on a nominal output power. However, given the variations in time during when a VCSEL is on and between successive pulses, the actual exposure for a given pixel or sub-pixel may be less than or more than the expected or nominal pixel which the image processing and/or print engine intended to produce which may introduce imperfections in the printed image.

DETAILED DESCRIPTION OF THE DISCLOSURE

Figure 1:
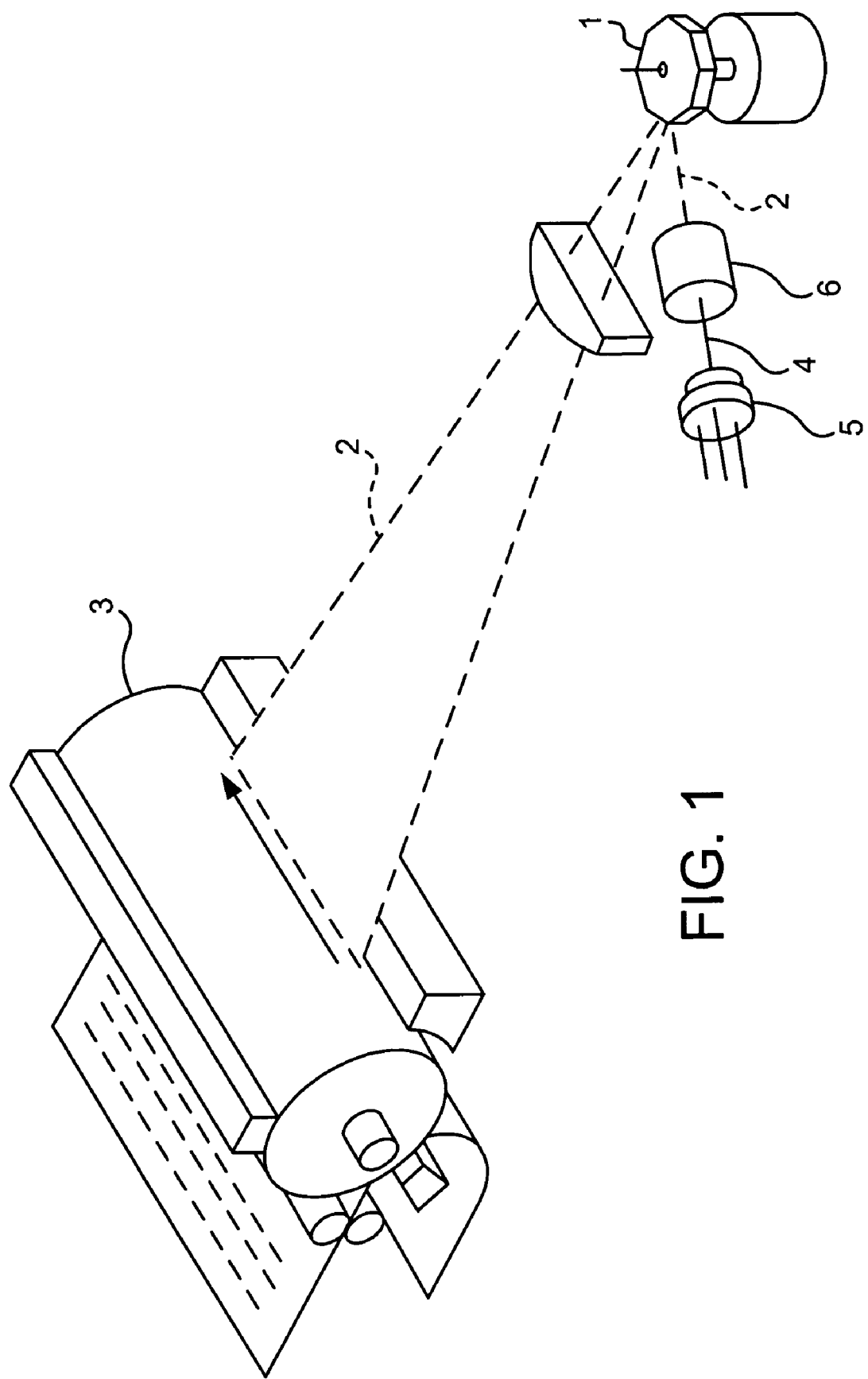
FIG. 1 illustrates an exemplary embodiment of an exposure system of a printer.

In the following detailed description and in the several figures of the drawing, like elements are identified with like reference numerals.

In an exemplary embodiment, a method of compensating for the changes in a VCSEL laser output power in a printer may include a digital circuit using correction factors stored in memory and an algorithm for extracting correction factors to modulate at least one of either VCSEL drive current or VCSEL duty cycle to account for changes in VCSEL output power during printing. An exemplary procedure may determine digitally the amount of correction needed using an estimation algorithm and memory. The algorithm and method may be implemented in printer hardware.

FIG. 1 illustrates a simplified diagram of an exemplary embodiment of a photoconductor drum exposure system in a laser printer. In an exemplary embodiment, a rotating scanning mirror 1 sweeps a laser beam 2 across the width of a photoconductor drum 3. The laser beam 2 is pulsed to selectively expose the surface of the photoconductor drum 3 in a line by line manner as the photoconductor drum 3 rotates thereby creating a latent electrostatic image onto which toner is developed. In an exemplary embodiment, a laser exposure system may include a plurality of laser beams concurrently propagating in parallel through a single set of optics to expose areas on the surface of photoconductor drum 3.

In an exemplary embodiment, a switching circuit 7 (FIG. 2) drives the laser source, which may be a VCSEL laser diode 5, to control the pulsing of the laser beam 2. An area on the surface of the photoconductor drum 3 may be exposed in a nominal period of time to form a pixel element. In exemplary embodiments, various modulation techniques may expose sub-pixel areas on the surface of photoconductor drum 3.

In an exemplary embodiment, the printing resolution may be limited by the size of the pixel element. High resolution printing may include more rapid switching of the laser diode 5 from the off state to the on state and the on state to the off state to create relatively smaller pixel elements.

Referring again to FIG. 1, in an exemplary embodiment, a portion of the cone of light 4 emitted from laser diode 5 is passed through collimating lens 6 to form laser beam 2. The cross sectional profile of the laser beam 2 focused on the surface of photoconductor drum 3 may be gaussian in both the horizontal and vertical dimensions of the beam width. In an exemplary embodiment, uniform development of the latent electrostatic image may be improved by maintaining uniformity of the surface voltage of the photoconductor drum in the exposed areas. In an exemplary embodiment, achieving a desired degree of surface voltage uniformity may involve controlling the sensitivity of the photoconductor drum 3 and the output power of the laser beam 2 across the length of the photoconductor drum 3.

Figure 2:
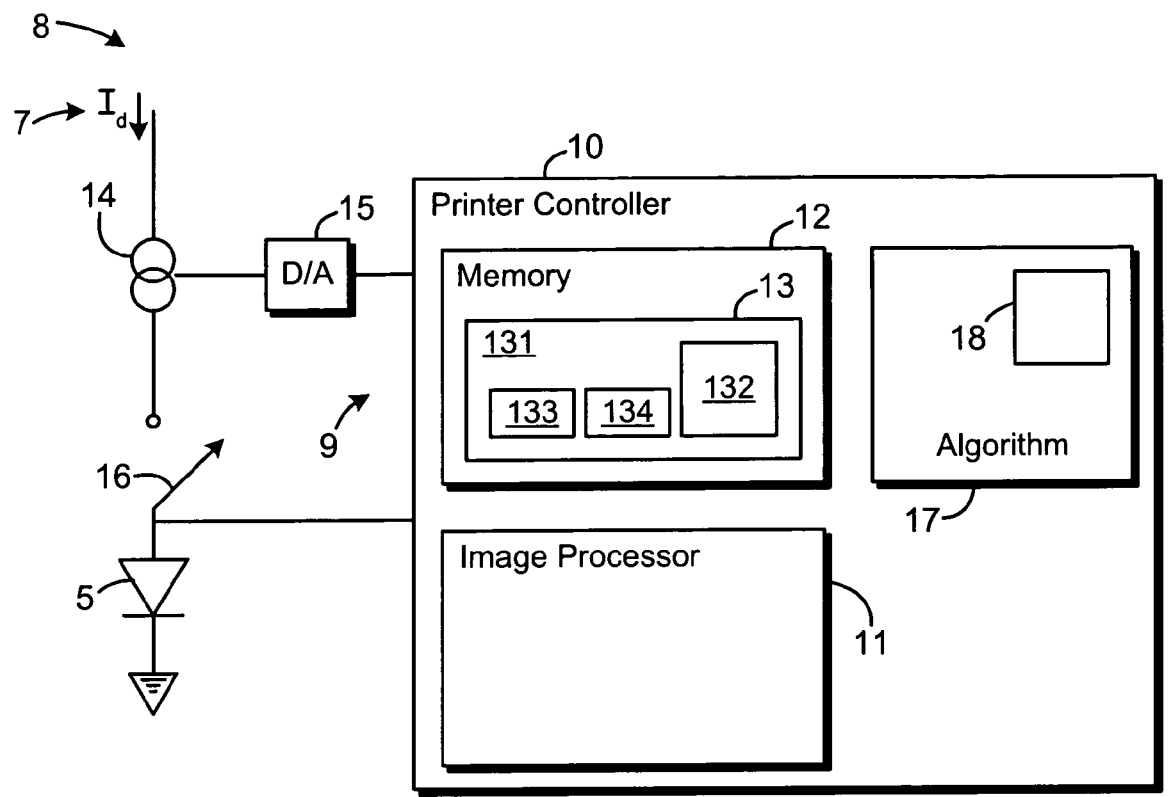
FIG. 2 illustrates a functional block diagram of an exemplary embodiment of a printing system.

FIG. 2 illustrates a simplified, functional block diagram of an exemplary embodiment of printing system 8 with a VCSEL laser 5. In an exemplary embodiment, the printing system 8 may include a digital correction circuit 9. In an exemplary embodiment, the digital correction circuit 9 may include a printer controller 10, an image processor 11 and memory 12. In an exemplary embodiment, the controller may include image processing ASIC's and/or FPGA's (Field Programmable Gate Array), one or more microprocessors, memory, and other computer components such as, for example, communication devices and/or hard disks. The microprocessors may execute programs which transform external document data into data which the image processing components can understand. The microprocessors may execute other programs to control the different components of the printer, for example, a -paper feeder, and a marking agent or toner ink supply.

In an exemplary embodiment, the image processor 11 may be incorporated as part of the controller 10 and may include ASIC's and/or FPGAs, or high-speed programmable signal processors. The image processor may take the data from the controller and generate control signals for the lasers. In an exemplary embodiment, the memory may be incorporated into an ASIC on the printer (for example a laser control ASIC) and or an FPGA. In an exemplary embodiment, memory may include volatile memory—used, for example, during program execution—and may include non-volatile memory—used, for example, to store calibration parameters and firmware.

In an exemplary embodiment, the printer controller may include an algorithm 17 for determining a control factor for controlling the VCSEL. In an exemplary embodiment, the algorithm may be incorporated in an ASIC, an FPGA and/or in a programmable processor, for example a high-speed programmable processor. In an exemplary embodiment, the algorithm 17 may comprise processor executable instructions.

In an exemplary embodiment, the image processing component uses a time-based modulation to control toner development in a "pixel". The image processing components take the subtractive color encodings which give an intensity value for the respective colorant and generate a value in terms of time exposure. This process may involve some form of screening algorithm. The time exposure may be defined in fractions of pixel time (the time it takes for the scanner to traverse one pixel on the drum). The units are often in multiples of 1/256th or 1/64th of a pixel. Therefore, instructions may be sent to a PWM (Pulse Width Modulator) to turn on the laser for some number of PWM units (for example, 128/256ths for half a pixel, or 64/64ths or a full pixel—meaning it covers the full, or entire pixel area). Whether a system uses 1/256th or 1/64th granularity may depend on the particular instantiation of the blocks. In addition to the exposure time, the PWM may receive a justification or position code to tell it to put the pulse (like the half or partial pixel pulse) to the left side, right side, or center of the pixel area. A system that uses power modulation (controlling pixel intensity by changing the laser power), may have image processing algorithms that output laser intensity control numbers. These numbers will be sent to the digital to analog converter which determines the drive current for the laser.

In an exemplary embodiment, the image processor 11 may determine when and for how long the VCSEL 5 should be pulsed on to expose a given pixel or sub-pixel area. In an exemplary embodiment, the image processor 11 determines the exposure assuming a nominal, constant VCSEL output power through the duration of an "on" pulse and a nominal duty cycle or duration of the pulse. In an exemplary embodiment, the correction circuit 9 may provide a correction factor to the nominal power and/or duty cycle for a pixel or sub-pixel area as determined by the image processor 11 in order to control the output power of the laser beam 2 (FIG. 1) through the duration of a pixel or sub-pixel exposure and across the length of the photoconductor drum 3 (FIG. 1) among subsequent "on" pulses.

In an exemplary embodiment, a lookup table or tables 13 may be stored in the memory 12. In an exemplary embodiment, the lookup tables 13 may include a power correction table 131 and a jump table 132. A power correction table 131 may include, for example, an active power correction table 133 and an inactive power correction table 134. In an exemplary embodiment, the lookup table 13 may include digital information relating to correction factors for adjusting the laser exposure by modulating one of either output power or duty cycle to account for changes in VCSEL output power over time and/or between subsequent pulses. In an exemplary embodiment, the algorithm 17 may keep a running count 18 of the position, for example a pixel position count, within the power correction table 131 for determining a correction factor for controlling the VCSEL.

In an exemplary embodiment, the correction circuit 9 may control the energy absorbed in an exposure by controlling the power output of the VCSEL by modulating the driver current Id provided by a current source 14. In an exemplary embodiment, the control circuit 9 may include a D/A converter 15 to provide a control signal to the current source 14 for generating an analog drive current Id corresponding to a correction factor determined by the correction circuit 9.

Figure 2A:
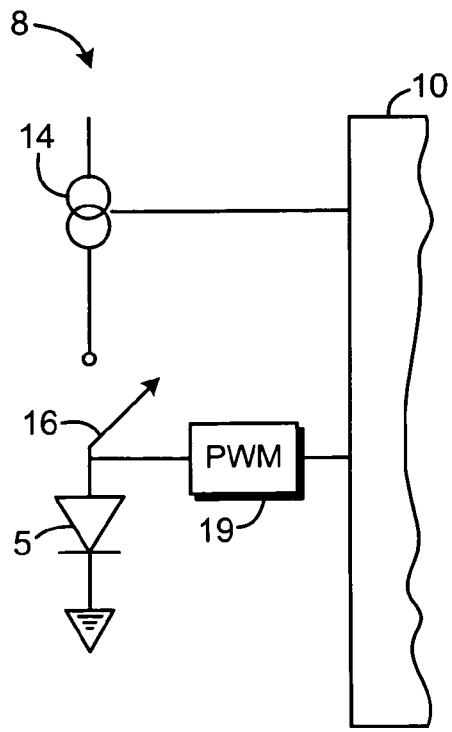
FIG. 2A illustrates a functional block diagram of an exemplary embodiment of a printing system.

In an alternate exemplary embodiment (FIG. 2A), the control circuit 9 may control the energy absorbed during a pixel of sub-pixel exposure by modulating the duty cycle of a current pulse. In an exemplary embodiment, the control circuit 9 may include a pulse width modulator device (PWM) 19, which may convert a digital control into pulse width to control the duty cycle of the VCSEL by controlling the duration of time during which the switch 16 is pulsed on.

Figure 2B:
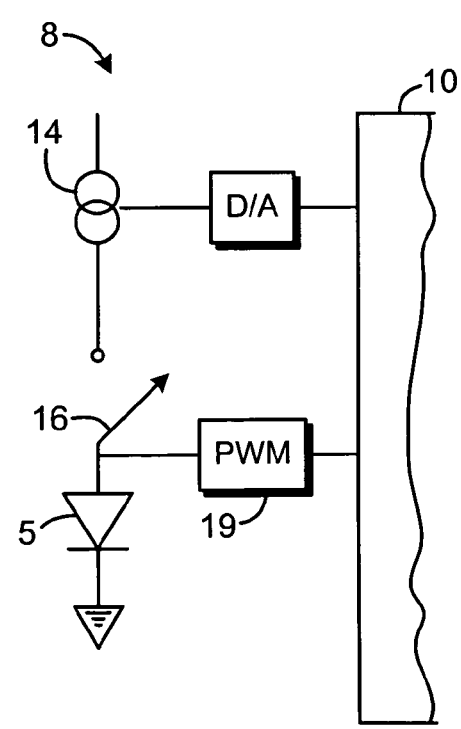
FIG. 2B illustrates a functional block diagram of an exemplary embodiment of a printing system.

In an exemplary embodiment, the control circuit 9 (FIG. 2B) may control the absorbed power during a pixel or sub-pixel exposure by modulating one or both of the duty cycle and/or the drive current of the VCSEL.

Figure 3:
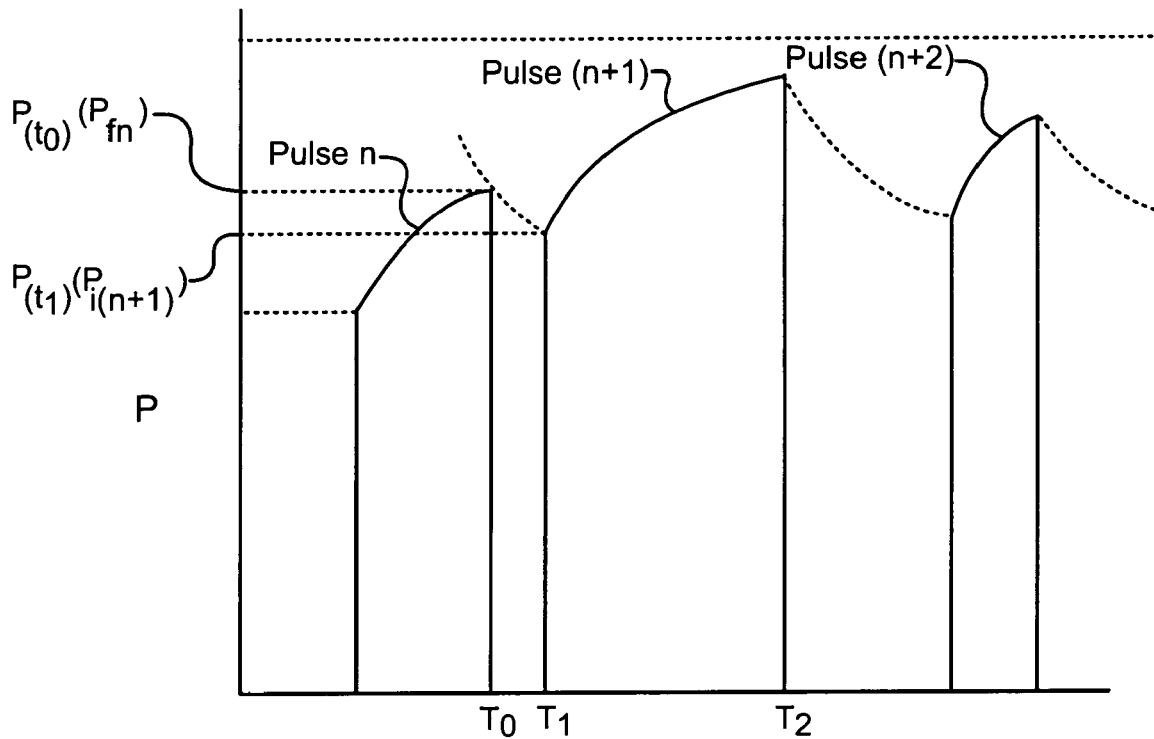
FIG. 3 illustrates the power response of a VCSEL laser to a series of current pulses.

In an exemplary embodiment, as illustrated in FIG. 3, the output power of a VCSEL has the characteristic of changing over time from an initial power (Pi) for a pulse to a final power (Pf) at the end of a pulse. FIG. 3 illustrates the response for three separate consecutive pulses, pulse n, pulse (n+1) and pulse (n+2). In an exemplary embodiment, the output power increases over time during the pulse. In other exemplary embodiments, the output power may decrease over time during a pulse. In an exemplary embodiment, the increase over time approximates and/or may be modeled as an exponential increase.

In an exemplary embodiment, the initial output power (Pi) for a pulse n+1 (which occurs after a preceding pulse n) may be different from the Pf for the immediately preceding pulse n. In an exemplary embodiment, the Pi(n+1) may be less than the Pf(n). In an exemplary embodiment, the Pi(n+1) may be less than the previous Pf(n+1) by an amount which may be calculated by or modeled by an exponential decrease. In FIG. 3, the power output for each pulse is shown as an exponential increase during the pulse. In FIG. 3, the dotted lines illustrate the exponential decrease of the Pi for subsequent pulses. In alternate exemplary embodiments, the $Pi_{(n+1)}$ for a subsequent pulse may be greater than the $Pf_n$ of the immediately preceding pulse.

In an exemplary embodiment, the VCSEL may be switched on by providing a pulse of current at a constant current level for the duration of each pulse. In an exemplary embodiment, the power response of the VCSEL changes during the pulse. In an exemplary embodiment, the initial power (Pi) at the start of each pulse is different from the final power (Pf) of the previous pulse. As a result, the power delivered during a pulse may depend on the width of the pulse as well as the previous on/off history of the pulse. In an exemplary embodiment, the magnitude of the power at the start of a pulse may also depend on the current. In the example of FIG. 3, the current pulses for each pulse are constant current pulses with the same current for each pulse.

In an exemplary embodiment, the power response may be modeled with exponential curves according to the following formulas—assuming a pulse n ending at time t0 and another pulse n+1 starting at time t=t1 and ending at t2, with $t0 \leq t1 \leq t2$:

$$P(t1)=P(t0)+(Pi-P(t0))(1-e^{-(t1-t0)/Td}); \text{and} \qquad \text{Eq'n 1:}$$

$$P(t)=P(t1)+(Pf-P(t1))(1-e^{-(t-t0)/Td}), \text{where } t1 \leq t \leq t2. \qquad \text{Eq;n 2:}$$

In an exemplary embodiment, for a given current, the VCSEL will have a minimum initial current when the VCSEL is started from a "cold" condition and will approach a maximum power out when the VCSEL achieves saturated condition. For each pulse, the initial power out at the start of a given pulse may be calculated according to equation 1 above and the power during a pulse may be calculated based on equation 2 above, the magnitude of which depends on the Pi as calculated from equation 1. In an exemplary embodiment, the variations of the power response may create pixel or sub-pixel exposures that deviate from the nominal exposures. In an exemplary embodiment, a printer controller 10 (FIG. 2) may modulate a current pulse provided to a VCSEL to adjust the response of the VCSEL to provide a pixel or sub-pixel exposure to be closer to nominal. For example, a correction circuit 9 (FIG. 2) may include a digital lookup table 13 (FIG. 2) with correction factors to account for changes in VCSEL power during a pulse and between pulses. The correction factors may be used to modulate either the current applied during a pulse or the time of the exposure for a pixel or sub-pixel or a combination of the two.

Figure 4:
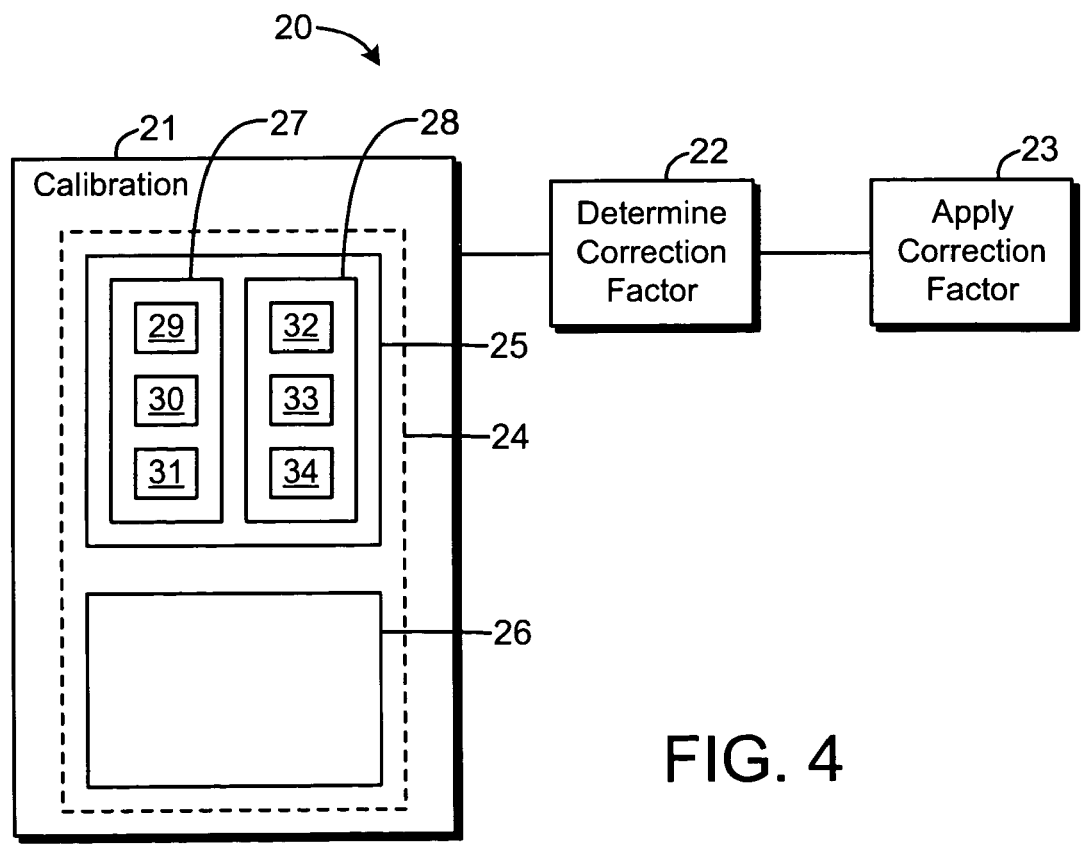
FIG. 4 illustrates an exemplary method of controlling a VCSEL printer.

FIG. 4 illustrates an exemplary embodiment of a method 20 for controlling the output power of a VCSEL device to account for variations in output power during a pulse and between consecutive pulses. In an exemplary embodiment, a method 20 for controlling the VCSEL power output may include a calibration process 21, a process for determining the correction factor 22 for a given pixel or sub-pixel exposure and the application 23 of the correction factor to modulate the power and/or exposure of the pixel or sub-pixel by a VCSEL.

In an exemplary embodiment, the calibration process 21 may be performed automatically. In an exemplary embodiment, the calibration process 21 may be performed automatically from time to time during printing, for example about once every page. In an exemplary embodiment, the frequency of performing the calibration process may depend on the how the VCSEL laser output power varies over time for a particular application or embodiment. In an exemplary embodiment, the frequency of the calibration process may be determined for a particular application or embodiment during the process of product development.

In an exemplary embodiment, the calibration process may include compiling 24 a look-up table (FIG. 4). In an exemplary embodiment, compiling 24 the lookup table may include compiling 25 a power correction table and compiling 26 a jump table. In an exemplary embodiment, compiling 25 the power correction table may include computing 27 an active power correction table and computing 28 an inactive power correction table. In an exemplary embodiment, compiling 24 the look-up table may include storing values for use when determining 22 a correction factor to be applied 23 for controlling VCSEL exposure to account for variations in the VCSEL output power during a pulse and between successive pulses of the VCSEL device. In an exemplary embodiment, the active table may be used for determining the changes in power which occur when a VCSEL is active whereas the inactive table may be used for determining the changes in power which occur when a VCSEL has been inactive. In an exemplary embodiment, the calibration process 21 may include determining the jump table values.

In an exemplary embodiment, computing 27 the active table may include sending 29 a pulse train of relatively long pulses (relatively long in comparison to a nominal pixel clock or period), measuring 30 the VCSEL power out for all or some of the pulses and recording 30 the values of the output power or values indicative of the output power in the table. In an exemplary embodiment, computing 28 the inactive power table may include sending 32 a pulse train of relative short (relatively short in comparison to a nominal pixel clock or period), measuring 33 the output power and recording 34 the output power values or values indicative of the output power.

The output power may be measured, for example, with an optical photoreceptor which provides an output voltage proportional to the optical power.

Figure 5:
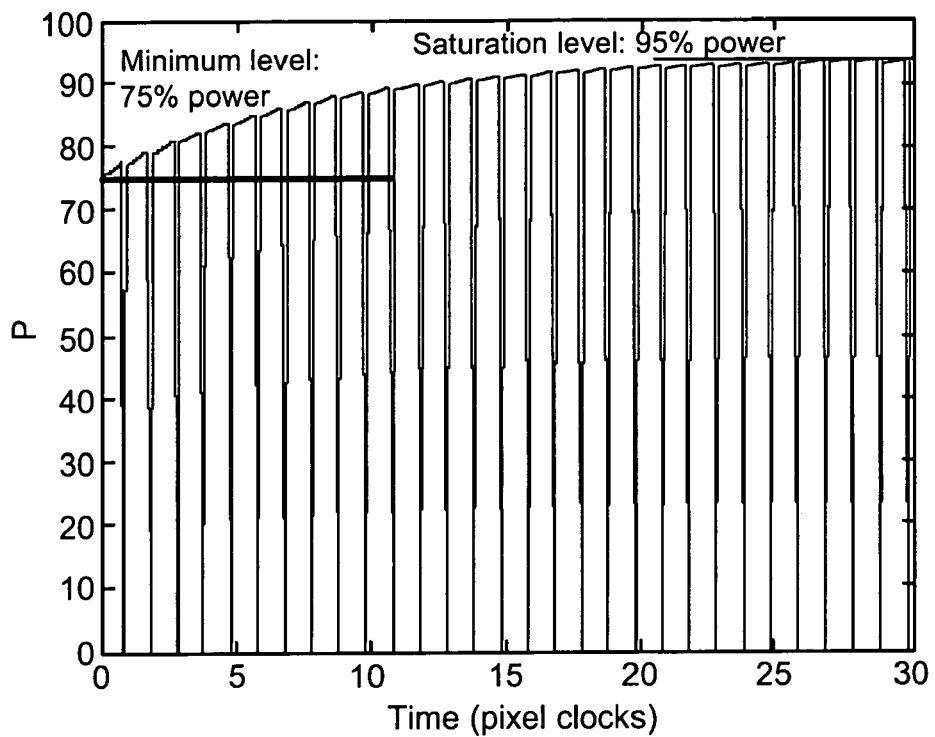
FIG. 5 illustrates the power response of a VCSEL laser during an exemplary embodiment of a calibration procedure.
Figure 6:
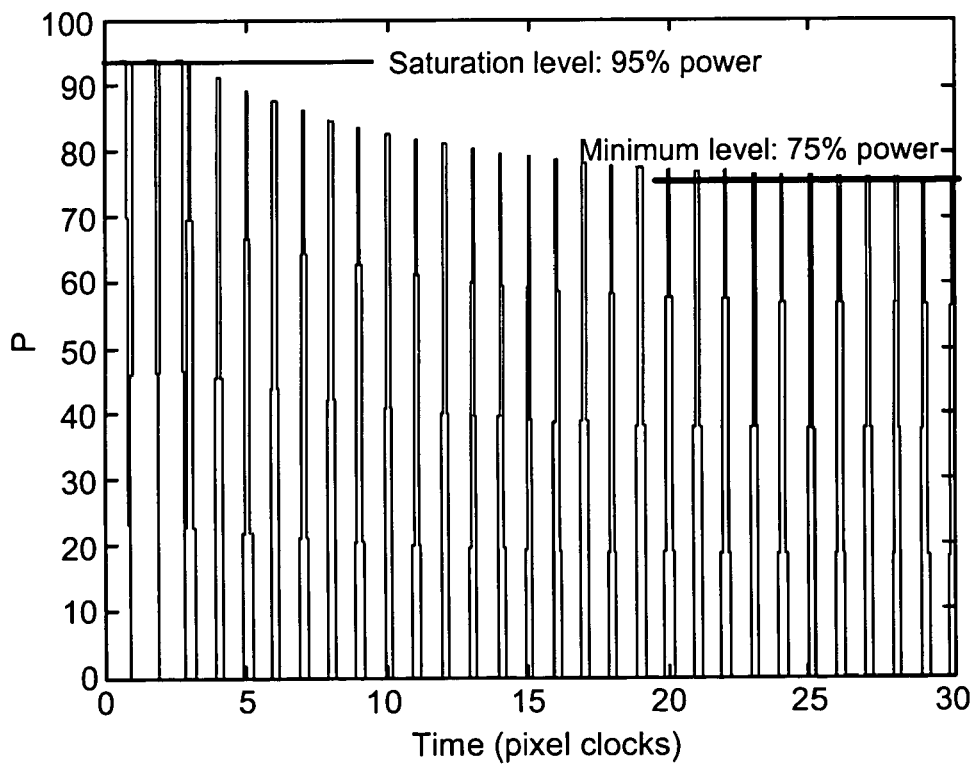
FIG. 6 illustrates the power response of a VCSEL laser during an exemplary embodiment of a calibration procedure.

In an exemplary embodiment, sending 29, 32 the pulse train may include providing a pulse train with pulses with a pixel clock or time period of Tp. FIG. 5 illustrates an exemplary embodiment of the power response of a VCSEL to a train of relatively long pulses for calculating 25 (FIG. 4) an active power correction table. FIG. 6 illustrates an exemplary embodiment of the power response of a VCSEL to a train of relatively shorter pulses (FIG. 6) for calculating 26 (FIG. 4) an inactive power correction table. In an exemplary embodiment, the period Tp may be selected such that it is much less than a time constant or decay constant Td. In an exemplary embodiment, the time period Tp may be on the order of about tens of nanoseconds, for example about 20 nanoseconds. In an exemplary embodiment, the time constant or decay constant 33 may be on the order of above about 4 microseconds or about 200 pixel clocks.

In an exemplary embodiment, the time constant or decay constant Td may be a characteristic value of the VCSEL which is equal to the amount of time it takes for the power response to reach about 65% of the difference between minimum power and full power and/or the time a VCSEL must be inactive before the initial power (Pi) of its next pulse will be 35% of the difference between the minimum power and full power for a give current. In an exemplary embodiment in which the power increase and decrease in initial power Pi behave according to an exponential model as described above with respect to equations 1 and 2, the time constant for an increase in power and the decay constant for a decrease in power may be substantially equal.

In an exemplary embodiment, each VCSEL may have a characteristic time constant. In an exemplary embodiment, several VCSELs may be grouped together and assigned the same time constant. In an exemplary embodiment, VCSELS may be grouped together so closely that they share a common or similar thermal effect, in which case, the calculations may be performed using an average time or decay constant for all the grouped VCSELs.

In an exemplary embodiment, the time for the VCSEL to substantially reach saturation—or full power—may be referred to as the saturation period. In an exemplary embodiment, the time for a VCSEL to be inactive until a subsequent pulse has a substantially minimum initial power may be referred to as a decay period. In an exemplary embodiment, the saturation period and decay period may be substantially equal. In an exemplary embodiment, the saturation period and/or the decay period are approximately three times as long as the time constant or decay constant, respectively.

FIG. 5 illustrates the VCSEL power response during an exemplary embodiment of determining the active power correction table. In an exemplary embodiment, computing the active table may include sending a set of relatively long or full pulses to the VCSEL laser and measuring the power output. In an exemplary embodiment, a full pulse may be the nominal pulse when the VCSEL has reached saturation. In an exemplary embodiment involving correcting the pulse duty cycle, the full width may be something less than 100%, for example 75%. In an exemplary embodiment involving correcting laser power, the full pulse may be 100% duty cycle.

In an exemplary embodiment, the laser may be driven with a pulse which is about 15 nanoseconds long, or about 75 percent of the pixel clock. In an exemplary embodiment, the VCSEL may be driven with a pulse having a driving current that is at the nominal, full power drive current for a VCSEL at saturation. That is, the VCSEL may be driven with a pulse having a driving current that will provide nominal full VCSEL power after being in the on position with that current for a time greater than the time constant. In an exemplary embodiment, the VCSEL should have been de-energized or off for a period of time at least equal to the saturation period in order to ensure that the VCSEL starts from a cold state.

In an exemplary embodiment, an active power correction table 133 (FIG. 7) may be created by measuring 30 and saving 31 (FIG. 4) the output power values for each pixel clock in memory. In an exemplary embodiment, the output power values may be the average output power for one or serveral pixel clocks. In an exemplary embodiment, the output power values for less than all of the pulses may be detected and stored and the values for times between those detected and stored values may be calculated or estimated by interpolation along the curve of the response.

Referring to FIG. 5, in an exemplary embodiment, since the power is on for most of the pixel clock and is off for only a short period, the power out increases over time as though the VCSEL were on. In an exemplary embodiment of FIG. 5, since the duration of the pulses is something less than the full pixel clock, the maximum power achieved may be less than 100 percent nominal power, for example about 94 percent, even though the drive current is set at a value to achieve nominal full power when left on continuously.

Referring to FIG. 6, in an exemplary embodiment, the pulses may have a duration of about 5 nanoseconds and be spaced every 50 nanoseconds. In an exemplary embodiment, since the power is off for most of the pixel clock and is on for only a short period of time, the minimum initial power out at the beginning of each pulse decreases during the time between pulses between subsequent pulses in the train. In an exemplary embodiment, the output power values for each pulse may be measured and stored in an inactive power correction table 134 (FIG. 2). In an exemplary embodiment, after a number of pixel clocks equal to about the saturation period (or about three times the time constant Td), the power output equals approximately the minimum initial power out for a cold laser. In an exemplary embodiment, the minimum initial power out for a cold laser with nominal, full power current input may be about 75 percent of nominal full power.

Figure 7:
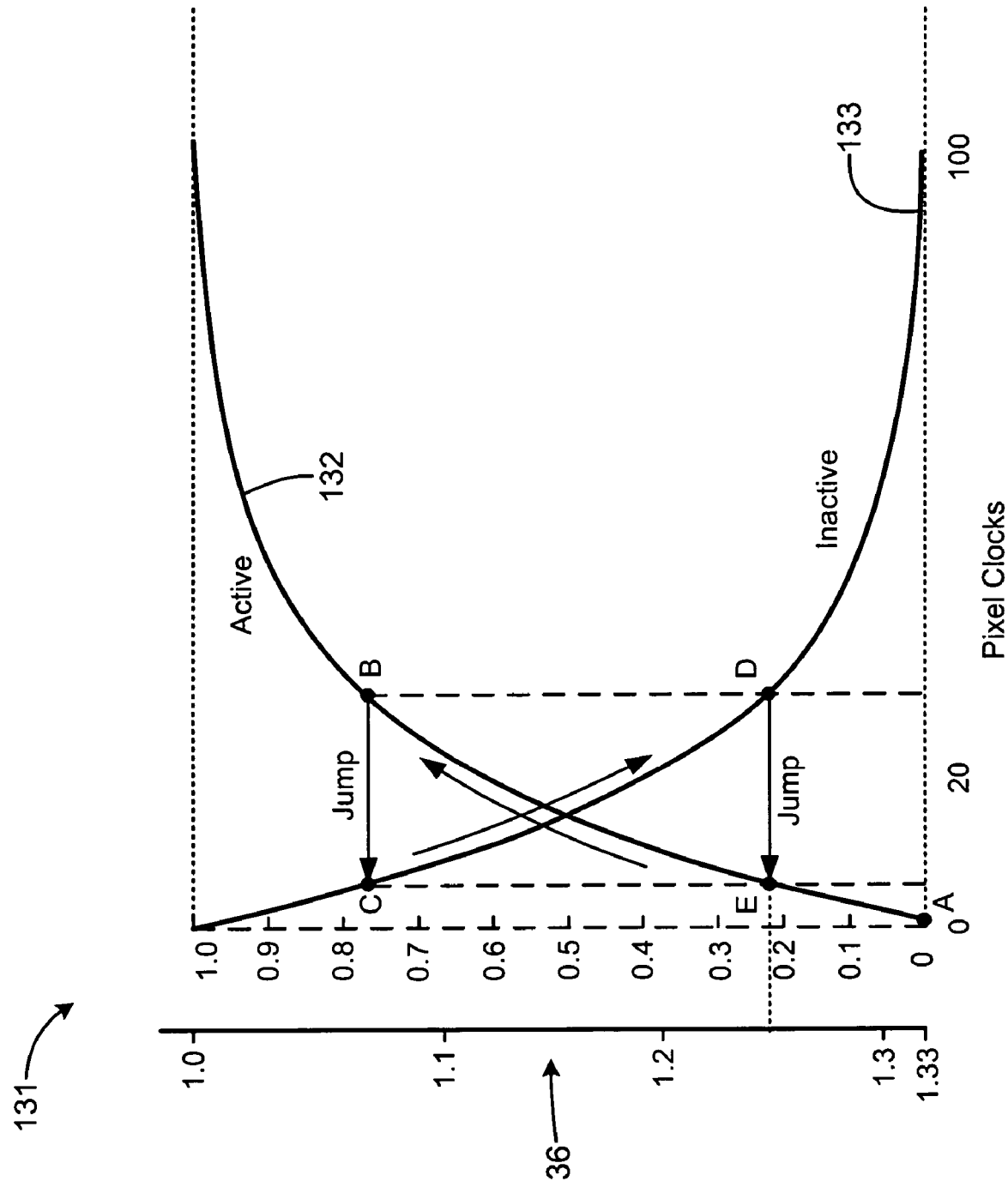
FIG. 7 illustrates a graphical representation of an exemplary embodiment of a power correction table.

FIG. 7 illustrates a graphical representation of an exemplary power correction table 131 with active and inactive power correction tables 132, 133. In an exemplary embodiment, the active power correction table 132 may store the pixel clock values and the power out values or values representative of the power out. In an exemplary embodiment, the active and inactive power correction tables 132, 133 may store numbers reflecting the relative magnitude of the power output values, for example from zero to 1 in the y component of a table graphically represented in FIG. 7.

In an exemplary embodiment, the active and the inactive power correction tables 132, 133 may be finite because the response of the VCSEL reaches a maximum power out or a minimum initial power out after a number of pixel clocks equal to the saturation period (or three times the time constant Td). In an exemplary embodiment, a power correction table 131 may have at least as many table positions as the number of pixel clocks in the saturation period. For table positions higher than the number of pixel clocks in the time constant, the correction factor will remain the same. In the exemplary embodiment of FIG. 7, for example, the table may have values for about 100 pixel clock counts for each of the active and inactive tables 132, 133.

In an exemplary embodiment, the table may store the (x,y) coordinates along the graphically represented active and inactive power correction table of FIG. 7. In an exemplary embodiment, the x-coordinate values represent the time in numbers of pixel clocks and the y-coordinate values may be a correction factor 36 representative of the relative output power and/or current. In an exemplary embodiment, the y-coordinates may correspond to a number from zero to one, where zero corresponds to minimum initial power for a cold VCSEL and one corresponds to the maximum, nominal output power for nominal current for a saturated VCSEL. In an exemplary embodiment, y-coordinate of the active power correction table may correspond to drive current as a proportion of nominal drive current, necessary to correct for the decreased VCSEL output, as explained further below.

In an exemplary embodiment, the active power correction table calibration 21 (FIG. 4) is performed using a reference current pulse. For example, the reference nominal full current may be the current required to achieve nominal full power when the VCSEL has been active long enough to be at saturation. In an exemplary embodiment, the relationship between output power from a VCSEL and the magnitude of the current pulse may be approximately linear within the control range of the current. In an exemplary embodiment, the power correction table may be used to determine what percentage of the nominal, reference drive current is required to achieve nominal full power for a given pixel at a given time. In an exemplary embodiment, assuming a linear relationship between output power and drive current, and a minimum initial power output of 75 percent of nominal full power, the y-coordinate may range from 1.33 (1.0/0.75) at the bottom of the graph to 1.0 at the top.

In other words, a current with a magnitude of 1.33 times the nominal current may be required to get a power response with a nominal power output from a cold VCSEL where a current with a magnitude equal to the nominal current may be required to get a nominal power response from a saturated VCSEL. The current to achieve nominal power response from a VCSEL at a level of saturation between cold and saturated may be determined from the correction factors 36 stored in the power correction table 131 (FIG. 7).

At the one end of the spectrum, a pixel or sub-pixel to be printed at a time when the VCSEL for exposing the particular pixel has been on for a number of pixel clocks equal to or longer than the saturation period, the required current would be the reference percentage of full current used during the calibration—namely the nominal, reference current. On the other end of the spectrum, a pixel to be printed from a VCSEL which has been off for a period of time equal to or greater than the saturation period may require a current equal to the nominal reference current times the ratio of the maximum power output at saturation over the minimum initial power output of a cold VCSEL. For points in between, the ratio may be taken from the correction factors 36 stored in the active power correction table 132 (FIG. 7).

In an exemplary embodiment, the active power correction table may store the values of the current instead of a percentage of nominal or some other value representative of output power or current. In an exemplary embodiment, determining and storing the current values may avoid an additional step of calculating the current and/or time values from the table for each drive pulse for the VCSEL. In an exemplary embodiment, there may be a linear relationship between VCSEL current and VCSEL output power so the two may be used alternatively and/or interchangeably as desired.

In an exemplary embodiment, it may be necessary to determine an amount of exposure—in terms of current and duty cycle. In an exemplary embodiment, determining the amount of exposure may include determining the current which obtains the nominal power. In an exemplary embodiment, a calibration process may include developing data representative of how changes in exposure or duty cycle affect output power so that correction factors may be calculated. In an exemplary embodiment, a calibration may be sufficiently accurate to be within the range of the intended power correction, which may be within 20%-25% of nominal power.

In an exemplary embodiment, the active correction table may be used to determine 22 (FIG. 4) a correction factor for exposure of a particular pixel or sub-pixel. In an exemplary embodiment, the appropriate position on the active power correction table may be found by keeping a running count up—and down—of the pixel clock position.

In an exemplary embodiment, the following example illustrates how the values developed for the active power correction table may be used to determine the correction factor to be applied when a VCSEL is pulsed to expose a pixel. In an exemplary embodiment, starting with a cold VCSEL, the running pixel count may begin at the pixel clock position of zero—position A. In an exemplary embodiment, the printer controller 10 and/or image processor 11 may determine that the first pixel should be active. In an exemplary embodiment, the active power correction table shows that the current for the first active pixel should be determined by the correction value corresponding to the zero position-or namely about 1.33. After the first pixel is exposed, the pixel running count is updated to 1. If the next pixel is also active, we move to the pixel clock=1 position of the active power correction table—and the current for exposure of the next pixel is taken from the correction factor value corresponding to the "1" position. This continues for as long as the pixel is active. If, in an exemplary embodiment, the image controller 11 determines that each of the next consecutive pixel positions through, for example, pixel clock =35—then the pixel count is updated for each pixel—and the corresponding current to drive the VCSEL is drawn from the corresponding correction factor for each consecutive position. This continues from position A to position B on the active table 132 curve in the direction of the arrow shown.

When the next pixel is to be inactive, the pixel position running count is updated not by adding a count one to the running total, but by jumping to the corresponding pixel count position of the inactive power correction table. For example, if the pixel clock position 35 at position B is to be inactive—after 35 consecutive active pixels—the running count is updated to the pixel count number corresponding to the position on the inactive power correction table that has the same correction factor value as that position on the active table. In the example illustrated in FIG. 7, this results in a running count adjustment of about minus thirty—to position C on the inactive curve which corresponds to about pixel count position 5. For each consecutive, inactive pixel following the first inactive pixel, the pixel count is updated by adding one to the pixel count for each pixel count. If, in an exemplary embodiment as illustrated in FIG. 7, the VCSEL may remain inactive for about 25 pixel counts, the running pixel count would move down the inactive table along the arrow shown to about position D on the inactive power correction table, which may correspond to a pixel count position of about 30. If the following pixel is to be active, the running count may be adjusted not by adding one to the jump count, but by jumping to the corresponding position in the active power correction table with a correction factor which is about equal to the correction factor from the inactive table. In the exemplary embodiment illustrated in FIG. 7, this results in an adjustment of about minus 25 and a pixel position number of about 5 at about position E of the power correction table. The correction factor for the pixel exposure will be taken from the corresponding correction factor for position E. In an exemplary embodiment, a jump table stores the value for updating the running pixel count when switching from an inactive period to an active period or from an active period to an inactive period.

Figure 8:
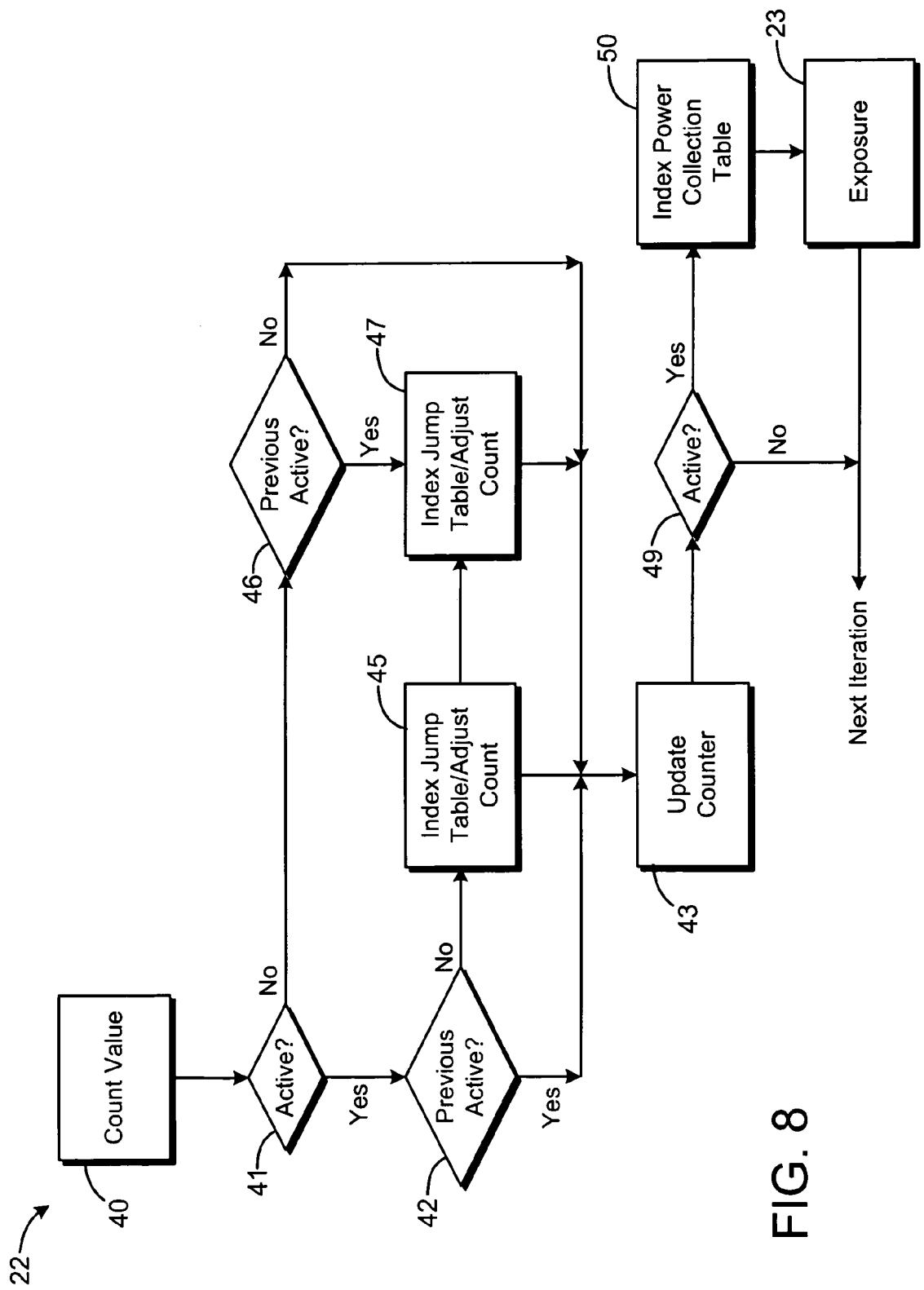
FIG. 8 illustrates an exemplary embodiment of an algorithm for determining a correction factor for controlling a VCSEL and applying a correction factor to control the operation of a VCSEL.

FIG. 8 illustrates an exemplary embodiment of an algorithm for determining 22 the correction factor at a given time. In an exemplary embodiment, the algorithm keeps 40 a running count of the appropriate pixel clock position along the active or inactive table. The algorithm also involves jumping from an inactive table to the active table or vice versa, when appropriate based on the active/inactive status of the next pixel/sub-pixel to be exposed. In an exemplary embodiment, the correction factor (relative power/current/exposure levels) stored in the active power correction table for the particular table position may be used to apply 23 (FIG. 4) the table to the VCSEL to provide the appropriate exposure, power level and/or duty cycle.

In an exemplary embodiment, determining 22 the correction factor or extracting the appropriate, adjusted exposure value from a table may include determining 41 whether a pixel is active. Determining 41 whether the pixel is active may include checking whether the current pixel to be printed in an image is active or inactive. If the pixel is to be active, the algorithm may determine 42 whether the previous pixel was active. Determining 42 whether the previous pixel was active may include checking whether the previous pixel in an image was active or inactive. If the previous pixel was active, the running count is updated by adding 43 one jump value 1 (one pixel clock) to the correction counter. If the previous pixel was not active, then index 45 the jump-table with the current count and adjust the number of pixel counts by adding or subtracting an appropriate adjustment to the correction counter in order to jump to the inactive table. Then update 43 the correction counter by adding one.

If the current pixel is not active, then there is no pixel exposure and it may therefore not be necessary to determine the exposure. In an exemplary embodiment, the algorithm may include determining 46 whether the previous pixel was active. If yes, then index 47 the current count with the jump table and adjust the number of pixels counts which have to be added or subtracted to the correction counter to obtain the new correction counter index. The counter is then updated 43 by adding one to the correction counter. If the previous pixel was not active, the counter is updated 43 by adding a pixel clock.

In an exemplary embodiment, if the current pixel is active 49, then the correction factor must be applied 23. In an exemplary embodiment, prior to applying 23 the correction factor, the current count may be indexed 50 with the active power correction table to determine a correction factor or select the appropriate relative power/current value to be converted to an analog value to control the exposure and applying the appropriate modulation of the drive current signal. In an exemplary embodiment, applying 23 the correction factor may include selecting the duty cycle for the current pixel as well if the pulse duration is to be corrected or modulated rather than power.

In an exemplary embodiment, the correction factor determined in the algorithm may be used to time modulate or power modulate the signals to the VCSEL. In an exemplary embodiment, power modulation by controlling the current input to the VCSEL involves determining the current to achieve the desired, nominal initial output voltage as described above.

In an exemplary embodiment, the exposure may be modulated by modulating the time of exposure for each pixel clock exposure. In an exemplary embodiment, the nominal, full exposure may be assumed to be a given current for some percentage of the pixel clock that is less than the full pixel clock, provides sufficient exposure to create a pixel and is sufficiently less than the duration of the pixel clock to accommodate longer "on" duration to increase power absorbed during an exposure.

In an exemplary embodiment, time modulation may be used where the characteristic power curve of the VCSEL has a power at the end of an on period less than the initial power at the beginning of a pulse. In such a case, the first pixels for a cold or recently inactive VCSEL may be driven for less than the entirety of a pixel clock and pulses occurring after a longer string of on periods may be exposed for periods of time closer and closer to the full duty cycle or pixel clock. In an exemplary embodiment, the jump table may include values representative of the fraction of a duty cycle that a VCSEL should be on to achieve the desired exposure during an on cycle. In fact, it is possible to store in the table the exposure time, rather than power level, so that the exposure time calculation does not need to be performed for each pixel. In an exemplary embodiment, the relationship between power and time may be assumed to be approximately linear.

In an exemplary embodiment, the VCSEL diode may be controlled using a digital circuit to compute or determine a correction factor for control of the signal. In an exemplary embodiment, the digital circuit may access a digital active power correction table to determine a correction factor to account for variations in time of the VCSEL power output. In an exemplary embodiment, the correction factor may be applied to modulate the duty cycle of an exemplary VCSEL diode to achieve the desired power to be absorbed during a particular pixel exposure. In other exemplary embodiments, the correction factor may modulate the current applied during a particular pixel clock period to adjust the power absorbed during a particular pixel to a desired level.

In an exemplary embodiment, the table implementation may be further optimized by storing only the active power correction table—each position being indexed to the correct jump count for the corresponding position in the inactive table. In an exemplary embodiment, the pixel count may not be stored as part of the table because it is the index into the table. The other three values are stored in the table—the corresponding correction factor, the active/inactive jump value and the inactive/active jump value.

The implementation may be further refined because the inactive/active jump count and the active/inactive jump count values are the same—in one case it is an increase in the correction counter and in the other a decrease. In an exemplary embodiment, this is possible because while the laser is inactive, the algorithm keeps track of the pixel count position within the table, so the inactive power correction values are not used. When the VCSEL is active, the algorithm keeps track of the pixel count position within the table and provides the correction factor for the pixel/sub-pixel to be exposed by the active VCSEL. At the beginning of the next pulse, the algorithm extracts the jump value from the jump table to determine the new position within the active power correction table.

In an exemplary embodiment, a number of commercial VCSEL drivers may be available. In some exemplary embodiments, the VCSEL drivers may include high-speed digital input for turning them on and off and a lower-speed analog control for the drive current. In an exemplary embodiment, such a device may be modified to accommodate an exemplary digital control system as described above since the switching times that the device supports may be very fast.

In an exemplary embodiment, such a digital VCSEL control scheme may be applied to a commercially available VCSEL device in which the available bandwidth for control current control is much lower than the bandwidth available for the laser switching signal. In an exemplary embodiment, such a digital system may be relatively simpler to implement than other methods of correcting VCSEL power because it may not be necessary to incur the additional cost to provide the circuitry needed to adjust power more quickly.

In an exemplary embodiment, using an exemplary digital control system may be modified to account for time responses other than the nominal, exponential time responses modeled above by adjusting the correction curve in the active power correction table and the jump table.

In an exemplary embodiment, using an exemplary digital control system may obviate the use of analog components to store control signals. The control signals may be stored in a correction curve and may be updated at will.

In an exemplary embodiment, a method of controlling VCSEL exposure may be integrated with a pixel modulated system. For example, a laser driver may be capable of providing more than one pixel exposure level. In an exemplary embodiment, the VCSEL power output in a pixel modulated system may be further affected by the particular pixel exposure level chosen by the image processor.

In an exemplary embodiment, a method for controlling the power output of a VCSEL may include adding an intended exposure of the current pixel to a remainder register. In an exemplary embodiment, the result of adding the intended exposure to the remainder register may be taken as the new exposure. If a new exposure is greater than full exposure, then the pixel may be treated as active, and the remainder may be reduced. If the new exposure is less than full exposure, the pixel may be treated as inactive, and the remainder may be left unchanged. In an exemplary embodiment, this approach may work where Td is much longer than the pixel clock so that there is a nominally linear relationship between the correction functions on neighboring pixels.

In an exemplary embodiment, the intended exposure may be determined with the power correction. In an exemplary embodiment, a solution may be to use a multiplier, but such a multiplier may be expensive to integrate in the system. However, since the correction factor has a relatively narrow range, namely about one percent to about twenty percent—a small number of bits, for example about three or four may be enough. In an exemplary embodiment, this may make a multiplier easy to implement.

In an exemplary embodiment, the correction factors may introduce a distortion in the signal which may produce some visible artifacts on repetitive patterns. In an exemplary embodiment, noise may be added to the correction signal to make these artifacts less visible. In an exemplary embodiment, the noise may be added as a random variation of the ON time of the pixel (if doing correction of pixel duty cycle) or a random variation of current (if doing correction of power). The variation should be small but enough to cause a perceptible effect. In practice, the variation will not be totally random, but a finite length sequence which produces noise-like results.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method for adjusting a drive current pulse for a laser diode, comprising:
   providing a power correction table comprising drive current pulse correction factors corresponding to counter positions;
   providing a jump table comprising counter position adjustments corresponding to correction factors;
   maintaining a count value of a position within a counter, wherein maintaining the count value comprises indexing the count value to the jump table and incrementing the count value for each of a series of pixel clocks; and
   determining a correction factor, wherein determining the correction factor comprises indexing the count value to the power correction table.

2. The method according to claim 1, wherein determining the correction factor comprises determining a current magnitude for the drive current pulse.

3. The method according to claim 1, wherein determining the correction factor comprises determining a duration of the drive current pulse.

4. The method according to claim 1, wherein the power correction table comprises an active power correction table and an inactive power correction table.

5. The method according to claim 1, wherein the power correction table comprises an active power correction table and the jump table includes active/inactive counter position adjustments for changing from an active to an inactive pixel and inactive/active counter position adjustments for changing from an inactive to an active pixel.

6. The method according to claim 1, wherein the power correction table comprises correction factor values representative of a ratio between a current magnitude to be applied to achieve nominal full-power and a nominal current for achieving full-power from the laser diode at saturation.

7. The method according to claim 1, further comprising modulating the drive current pulse by applying an adjustment according to the correction factor.

8. The method according to claim 7, wherein modulating the drive current pulse comprises providing an artifact reduction adjustment comprising a deviation from the adjustment according to the correction factor, wherein the deviation is random noise or noise-like.

9. The method according to claim 1 wherein the power correction table comprises correction factor values corresponding to durations for the drive current pulse to achieve a nominal full exposure.

10. The method according to claim 1 wherein the power correction table comprises correction values corresponding to current magnitudes for the drive current pulse to achieve a nominal full exposure.

11. An image forming system, comprising:
   a laser diode for exposing pixel areas for forming images with a nominal full pixel exposure;
   a current source for providing a drive current with a current magnitude to the laser diode;
   a switch for providing a drive current pulse with a duration to the laser diode; and
   a controller for controlling the current magnitude and the duration of the current pulse, wherein the controller comprises memory with a lookup table, wherein the lookup table includes correction factors for achieving nominal full pixel exposure indexed to corresponding pixel clock positions, and wherein the controller comprises processor executable instructions for maintaining a pixel count value and for determining a correction factor corresponding to the pixel count value.

12. The image forming system of claim 11, further including a digital to analog converter for digital control of the current magnitude.

13. The image forming system of claim 11, further including a pulse width modulator for digital control of the duration of the drive current pulse.

14. The image forming system of claim 11, wherein the controller comprises at least one of a CPU, ASIC or a field programmable gate array.

15. The image forming system of claim 11, wherein the lookup table comprises a power correction table and a jump table.

16. The image forming system of claim 15, wherein the power correction table comprises an active power correction table and an inactive power correction table.

17. The image forming system of claim 11, wherein the laser diode is a vertical cavity surface emitting laser (VCSEL).

18. An image forming system comprising:
   a drive current source;
   a switch;
   a controller for controlling the switch and drive current source to provide a current pulse having a current magnitude and a duration, wherein the controller provides modulation of at least one of the duration or current magnitude to achieve a nominal exposure responsive to the current pulse, wherein the modulation accounts for variations in laser diode output power during the pulse and variations in output power related to a final output power of a preceding pulse;
   and wherein the controller includes a digital lookup table comprising correction factors and the controller includes processor executable software for determining the correction factor to be applied to the current pulse.

* * * * *

UNITED STATES PATENT AND TRADEMARK OFFICE
CERTIFICATE OF CORRECTION

PATENT NO.        : 7,443,413 B2                                    Page 1 of 1
APPLICATION NO.   : 11/255566
DATED             : October 28, 2008
INVENTOR(S)       : Rodolfo Jodra et al.

It is certified that error appears in the above-identified patent and that said Letters Patent is hereby corrected as shown below:

In column 6, line 18, delete "33" and insert -- Td --, therefor.

Signed and Sealed this

Seventeenth Day of March, 2009

JOHN DOLL
*Acting Director of the United States Patent and Trademark Office*